United States Patent

Contrael et al.

[15] 3,661,613

[45] May 9, 1972

[54] DECORATOR PANELS

[72] Inventors: Ralph G. Contrael, High Ridge; Leo G. Stahlhut, Kirkwood; Richard E. Trippeer, Fenton, all of Mo.

[73] Assignee: K-S-H Inc., St. Louis County, Mo.

[22] Filed: Nov. 21, 1968

[21] Appl. No.: 777,775

[52] U.S. Cl. ...........................117/37 R, 117/8, 117/38, 161/138, 52/316
[51] Int. Cl. ...........................................B44c 5/04
[58] Field of Search ...........52/144, 311, 316, 630; 264/92; 161/7, 138; 117/8, 37 R, 38

[56] References Cited

UNITED STATES PATENTS

| | | | |
|---|---|---|---|
| 1,154,254 | 9/1915 | Lachman | 52/630 |
| 2,809,908 | 10/1957 | French | 52/630 |
| 2,889,651 | 6/1959 | Baldanza | 264/92 |
| 3,054,223 | 9/1962 | O'Brien | 52/144 |
| 3,087,577 | 4/1963 | Prestia | 52/144 |

FOREIGN PATENTS OR APPLICATIONS

| | | | |
|---|---|---|---|
| 534,306 | 1/1955 | Belgium | 52/630 |

*Primary Examiner*—Henry C. Sutherland
*Attorney*—Polster and Polster

[57] ABSTRACT

A plastic panel having bas-relief forms on both sides from a reference level, defining thereby at least three general levels, at least two of which are painted and at least one of which is substantially free of paint. A planar plastic sheet is positioned against a mold having spaced high mold sections, spaced intermediate mold sections and valleys defined by said mold sections, and formed onto the mold sections and into the valleys to form the bas-relief relative to the intermediate mold sections. The panel is removed from the mold and painted on both sides on the raised surfaces of the bas-relief islands.

1 Claim, 6 Drawing Figures

PATENTED MAY 9 1972

3,661,613

Inventors
LEO G. STAHLHUT
RALPH G. CONTRAEL
RICHARD E. TRIPPEER

By
Attorney

DECORATOR PANELS

BACKGROUND OF THE INVENTION

Vacuum formed plastic articles, including panels, have been silk screened and embossed extruded panels have, on occasion, been painted.

One of the objects of this invention is to provide a unique plastic panel with spaced surfaces painted on both sides, and a method of producing it.

Other objects will become apparent to those skilled in the art in the light of the following description and accompanying drawings.

SUMMARY OF THE INVENTION

In accordance with this invention, generally stated, a plastic decorator panel is provided which has bas-relief islands on both sides from a reference level, defining thereby at least three general levels, two of which are painted and one of which is substantially free of paint. Preferably, the bas-relief islands on both sides are painted on their raised surfaces. A method of producing these panels includes positioning a planar plastic sheet against a mold having spaced high mold sections, spaced intermediate mold sections and valleys defined by the mold sections, vacuum drawing the plastic sheet onto the mold sections and into the valleys to form the bas-relief, removing the panel from the mold and painting on both sides of the panel the raised surfaces of the bas-relief islands.

Preferably, the panel is painted by moving the panel and a paint-laden roller relative to one another while the roller engages only the raised surfaces of the side of the panel.

DESCRIPTION OF THE PREFERRED EMBODIMENTS

Figure 2:
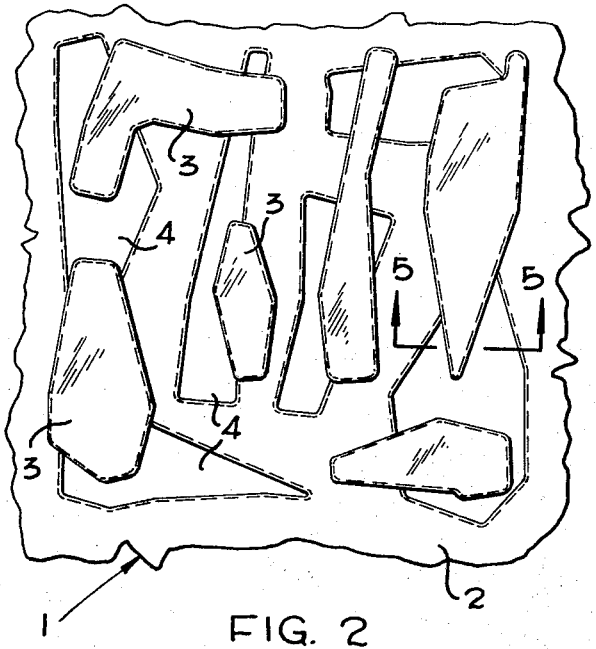
FIG. 2 is a fragmentary top plan view of another embodiment of panel of this invention.
Figure 1:
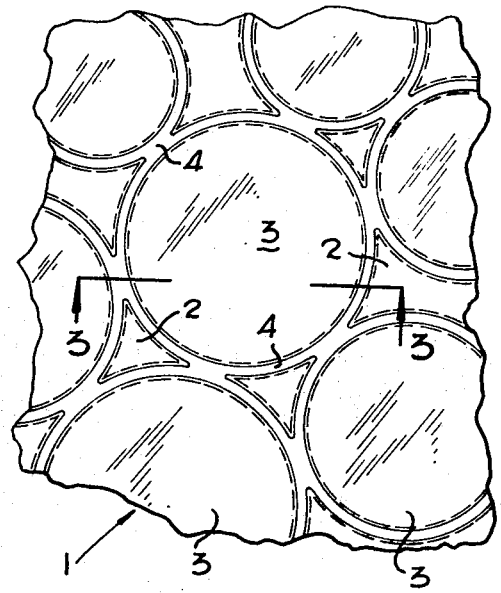
FIG. 1 is a fragmentary top plan view of one embodiment of panel of this invention.

Referring now to the drawings, and particularly to FIGS. 1, 2, 3, 5 and 6 for illustrative panels of this invention, reference numeral 1 indicates a panel which in edge elevation has three distinct levels. A reference level 2 is so-called because, while it may not be entirely planar, it is intermediate islands 3 and 4. In the panel shown in FIG. 1, the islands 3 are in the form of roundels, and the islands 4 in the form of ribs. In the embodiment of panel shown in FIG. 2, and islands 3 and 4 are in the form of free form patterned shapes which differ from one another, but are complementary in character, producing, in combination, a pleasing design within roughly square boundaries.

In both of the illustrative examples of panel shown, the outermost surfaces of the islands 3 and 4 are covered with paint, the layer on the upper surface of the island 3 being indicated by the reference numeral 5, the layer on the island 4 being indicated by the reference numeral 6.

In the case of the roundel pattern, the roundel islands 3 are covered with a transparent or translucent paint, whereas the rib islands 4 are covered with a lead-colored opaque paint, producing a leaded effect.

In the embodiment of panel shown in FIG. 2, the free form shaped islands 3 and 4 are covered with translucent paint of different but aestheticly compatible colors.

In both embodiments, the surfaces of the reference level 2 are unpainted. They may be, and preferably are, colored by virtue of coloring matter in the plastic sheet. One or both of the surfaces may also be textured to produce a frosted, woven, or other desired effect.

Figure 5:
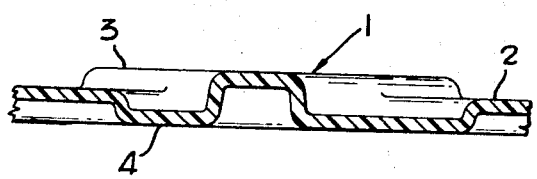
FIG. 5 is a sectional view taken along the line 5—5 of FIG. 2, illustrating an intermediate step in the method.
Figure 3:
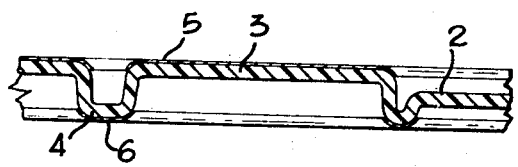
FIG. 3 is a sectional view taken along the line 3—3 of FIG. 1.
Figure 4:
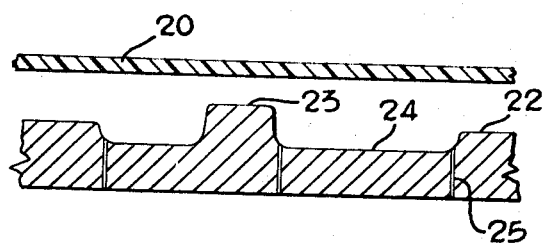
FIG. 4 is a fragmentary sectional view of a planar plastic sheet and vacuum forming mold illustrating an initial step in the method of making the panel shown in FIG. 2.
Figure 6:
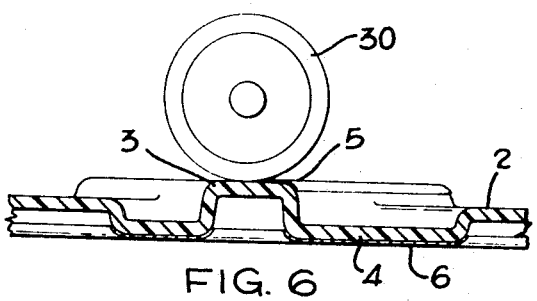
FIG. 6 is a sectional view of a panel corresponding to the view of FIG. 5, with a roller shown somewhat fancifully, illustrating another step in the method.

Referring now to FIGS. 4 through 6 for an illustrative method of this invention, reference numeral 20 indicates a planar sheet of thermoplastic, such as light stable translucent polystyrene, which is heated and placed in engagement with the uppermost surfaces of high mold segments 23 of a conventional vacuum former. In response to the application of vacuum through vents 25, the plastic sheet is forced down first onto upper surfaces of intermediate mold sections 22, and then onto bottom surfaces defining valleys 24. The resulting formed panel 1 is cooled sufficiently to receive paint, and is then passed beneath turning rollers 30 impregnated with paint in the usual manner of commercial paint rollers. However, the rollers 30 are so constructed and adjusted as to coat only the outer surfaces of the islands, as illustrated in the step shown in FIG. 6, leaving the surface of the reference level 2 unpainted. As an illustrative example, in FIG. 6, a first paint coat 6 on islands 4 has been permitted to dry, the panel has been inverted and is being sent beneath another roller 30 impregnated with the appropriate paint, to coat the outer surfaces of islands 3, leaving the reference level 2 uncoated.

By using colored plastic, a three-color panel is produced, using two colors of paint.

Numerous variations in the panel and method of this invention will occur to those skilled in the art in the light of the foregoing disclosure. Merely by way of example, the reference level 2, shown in the illustrative embodiments as defining a single plane, can be constituted by areas at different levels in different arrangements, so long as the islands 3 and 4 project beyond the planes defined by the points or surfaces furthest spaced from one another within the reference level. Different methods of painting may be employed. For example, the entire surface on one side of the panel might be sprayed, and then the outer surfaces of one set of islands wiped clean. The outer surfaces of the islands on the opposite side can then be painted or not, depending upon whether a contrasting color is desired. The plane sheet can be silk screened on one side in a pattern either substantially coextensive with the islands to be produced on that side or with the reference level pattern, and the islands on the other side painted with a roller. This requires a nicety of registry which is not easily obtained, however. Innumerable different configurations of the islands may be used. While vacuum forming of the sheet has certain advantages, the sheet can be formed by casting, injection molding, pressure forming or extruding, although coordinated embossing rolls would have to be used. These are merely illustrative variations.

Having thus described the invention, what is claimed and desired to be secured by Letters Patent is:

1. A plastic decorator panel having bas-relief islands on both sides from a reference level, defining thereby in edge elevation at least three general levels, paint on the outer of the surfaces of the bas-relief on both sides of the reference level and the surfaces of the reference level being substantially free of paint, said paints on the two levels differing from one another in at least one of the characteristics of color and opacity.

* * * * *